United States Patent [19]

Sedy

[11] Patent Number: 5,533,739
[45] Date of Patent: Jul. 9, 1996

[54] NON-CONTACTING SEAL WITH CENTERING SPRING MOUNTED IN DOVETAILED GROOVED

[75] Inventor: Josef Sedy, Mount Prospect, Ill.

[73] Assignee: Durametallic Corporation, Kalamazoo, Mich.

[21] Appl. No.: 202,689

[22] Filed: Feb. 25, 1994

Related U.S. Application Data

[63] Continuation of Ser. No. 896,647, Jun. 10, 1992, abandoned.

[51] Int. Cl.$^6$ .................................................. F16J 15/34
[52] U.S. Cl. ........................... 277/81 R; 277/85; 277/171
[58] Field of Search .......................... 277/38, 39, 43, 277/81 R, 84, 85, 171; 267/1.5

[56] References Cited

U.S. PATENT DOCUMENTS

| | | |
|---|---|---|
| 1,439,845 | 12/1922 | Seib et al. . |
| 3,559,725 | 2/1971 | Fucinari et al. . |
| 3,973,780 | 8/1976 | Hornsuch . |
| 5,039,113 | 8/1991 | Gardner . |
| 5,183,270 | 2/1993 | Alten et al. ............................ 277/81 R |
| 5,344,161 | 9/1994 | Sandgren .................................. 277/85 |

FOREIGN PATENT DOCUMENTS 838426  6/1960  United Kingdom ................... 277/171

*Primary Examiner*—Scott W. Cummings
*Attorney, Agent, or Firm*—Flynn, Thiel, Boutell & Tanis

[57] ABSTRACT

Non-contacting seal for shafts rotating at high speeds with improved centering means for low unbalance of seal rotating parts. Centering means comprise a shallow circumferential groove with slanted sides and an elastic centering strip of ladder-like form between two cylindrical surfaces to be held concentric. Since slanted sides of the groove overlap sides of the centering strip it cannot be displaced out of its groove during assembly, or during operation. Displaced centering strip could cause unbalance, vibrations, damage to the seal or to the surrounding equipment.

15 Claims, 1 Drawing Sheet

5,533,739

NON-CONTACTING SEAL WITH CENTERING SPRING MOUNTED IN DOVETAILED GROOVED

This application is a continuation of U.S. Ser. No. 07/896,647, filed Jun. 10, 1992, now abandoned.

FIELD OF THE INVENTION

This invention relates to sealing devices for rotating shafts where fluid is employed to generate pressure forces between interacting face-type sealing elements, in which one is stationary and the other rotating. These forces provide for slight separation and non-contacting operation of the above sealing elements, thereby minimizing face wear and friction losses while maintaining low fluid leakage.

BACKGROUND OF THE INVENTION

Non-contacting face seals are usually applied to high-speed high-pressure rotating equipment, where the use of ordinary mechanical face seals with face contact would result in excessive generation of heat and wear. Non-contacting operation avoids this undesirable face contact when the shaft is rotating above a certain minimum speed, which is called a lift-off speed.

As with ordinary mechanical seals a non-contacting face seal consists of two sealing rings, each of which is provided with a very precisely finished sealing surface. These surfaces are perpendicular to and concentric with the axis of rotation. Both rings are positioned adjacent to each other with the sealing surfaces in contact at conditions of zero pressure differential and zero speed of rotation. One of the rings is normally fixed to the rotatable shaft, the other located within the seal housing structure and allowed to move axially. The seal housing structure is normally stationary and fixed to the body of the compressor, turbine or pump to which the seal is applied.

To achieve non-contacting operation of the seal, one of the two sealing surfaces in contact is normally provided with shallow surface recesses, which act to generate pressure fields that force two sealing surfaces apart. When the magnitude of the forces resulting from these pressure fields is large enough to overcome the forces that hold seal faces closed, the sealing surface will separate and form a clearance, resulting in non-contacting operation. The character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, unlike the closing force, during the operation of the seal or on imposition of sufficient pressure differential, equilibrium separation between both surfaces will establish itself. This occurs when closing and opening forces are in equilibrium and equal to each other.

Equilibrium separation constantly changes within the range of gaps. The goal is to have the low limit of this range above zero. Another goal is to make this range as narrow as possible, because on its high end the separation between the faces will lead to increased seal leakage.

Since non-contacting seals operate by definition with a clearance between sealing surfaces, their leakage will be higher then that of a contacting seal of similar geometry. Yet, the absence of contact will mean zero wear on the sealing surfaces and therefore a relatively low amount of heat generated between them. It is this low generated heat and lack of wear that enables the application of non-contacting seals to high-speed turbomachinery, where sealed fluid is gas. Turbocompressors are used to compress this fluid and since gas has a relatively low mass, they normally operate at very high speeds and with a number of compression stages in series. This requires relatively long shafts that have to operate frequently above their critical speeds. Neither seals nor bearings can contact at these high speeds so shafts are therefore made to float on fluid cushions, both at the bearings and the seals.

In the above situation, it becomes important to make sure that the shaft does not vibrate excessively during operating speeds as well as during acceleration or deceleration. This means that the shaft inertia axis must be as close to its geometrical axis as possible, since the bearings will be forcing shaft rotation around its axis of geometry rather than around its axis of inertia.

Should there be a significant distance between the inertia and geometry axes, the shaft would be prone to vibration, making it more likely to contact stationary parts in its vicinity. Such contact may result in overheating, wear and perhaps a failure at the bearing or the seal. To prevent the above problem, shafts are normally balanced by a selective removal of shaft material or by a redistribution of weights at its periphery. This balancing thus eliminates the effects of machining inaccuracy and/or material non-uniformity.

Since the shaft rotates with components attached to it, such as compressor impellers, bearing sleeves and seal rings, it is necessary to balance it with these components in place. While many can be fixed to the shaft during its manufacture and therefore balanced in the manufacturer's shop, rotating parts of the non-contacting seal normally come as a part of the seal cartridge and are mounted onto the shaft on site in the process plant and thus away from the manufacturer's shop. Special care, therefore, has to be exercised to keep the unbalance of the rotating seal parts to a minimum. A key requirement in this regard is that rotating parts remain concentric to the shaft at all times.

This is not easy to accomplish, because seal components are often of diverse materials with widely different coefficients of thermal expansion and moduli of elasticity. As the machine goes through thermal and pressure cycles, clearances between concentric components may vary.

One way of maintaining the concentricity of components despite variation in clearance is to place flexible elements between both concentric components. As the clearance changes, the flexible element deforms elastically an equal amount all around and thus maintains concentricity.

One example of such a solution is prior art to U.S. Pat. No. 5,039,113. This patent shows how a rotating sealing ring can be supported by an elastic strip at its inner diameter. It also illustrates how two such elastic strips can be placed close to both ends of a relatively long sleeve, between its inner diameter and the shaft.

SUMMARY AND OBJECT OF THE INVENTION

This invention is aimed at the improvement of the centering property of an elastic element between rotating parts. Improvement is directed at problem points of the prior art design, one of which is the absence of a positive retention method for the elastic centering element in its groove.

The improvement this invention provides is a dovetail-shaped groove to positively retain edges of the elastic centering element. This is important, since during assembly process there are significant drag forces acting on the centering element in the axial direction and these often displace it out of the groove causing unbalance, even fracture of the element centered, if it is of a brittle material. Once assembled, it is difficult or impossible to check, whether centering strip is in the right position within its groove. When the sides of the groove are slanted to direct the edge of the centering strip towards the bottom of the groove, it will not have a tendency to slip out.

Another improvement is a ladder-like design of the centering element itself. With continuous edges at its sides interconnected by flexible links, centering element installs easily and minimizes changes in gap width between its ends when deflected. The centering element to prior art of the U.S. Pat. No. 5,039,113 provides for continuous longitudinal section near its centerline with sides which are discontinuous. Such element is not as easy to install and its end gap will vary more with deflection, creating residual unbalance.

DESCRIPTION OF THE PREFERRED EMBODIMENTS

Figure 1:
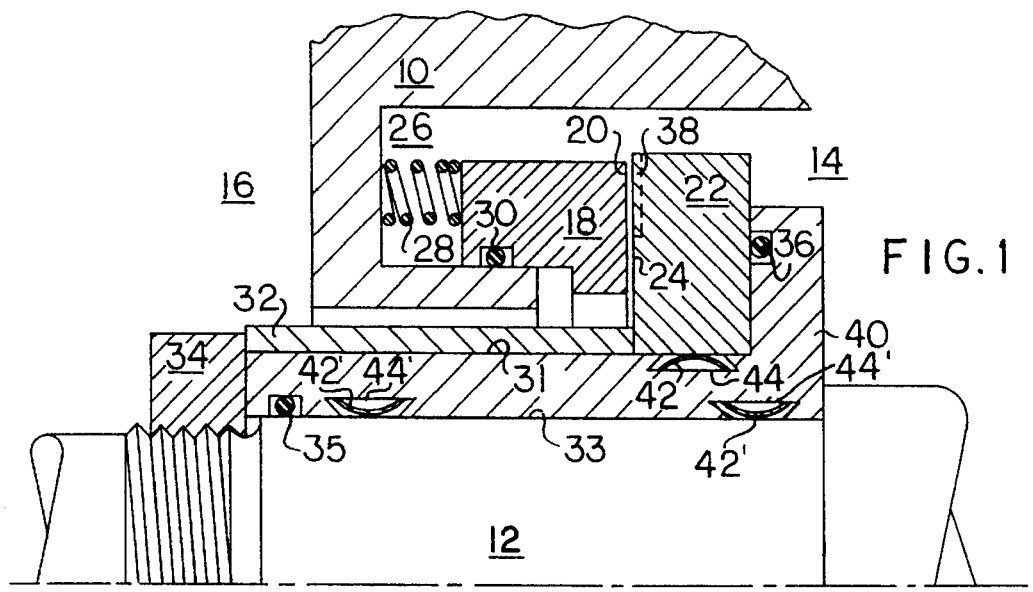
FIG. 1 is a cross-sectional view of a non-contacting seal, constructed in accordance with this invention, taken along the longitudinal axis thereof.

Referring first to FIG. 1, there is shown the invention and its environment. This environment comprises a housing 10 and a rotatable shaft 12, extending through said housing. The invention is applied to seal a fluid within the annular space 14 and to restrict its escape into the fluid environment at 16. The basic components of the invention comprise an annular, axially movable sealing ring 18, having a radially extending face 20 in a sealing relationship with a radially extending face 24 of an annular rotatable sealing ring 22. The sealing ring 18 is located within cavity 26 of housing 10 and held substantially concentric to rotatable sealing ring 22. Between housing 10 and the sealing ring 18 is a plurality of springs 28, spaced equidistantly around the cavity 26 of housing 10. Springs 28 urge the sealing ring 18 into engagement with the sealing ring 22. An O-ring 30 seals the space between the sealing ring 18 and the housing 10. The sealing ring 22 is held concentric to a shaft sleeve 40 by an annular centering strip 42 which is elastically deformed between the inner diameter of ring 22 and sleeve 40 and retained within sleeve 40 by slanted sides of an outwardly facing dovetail-shaped radial groove 44. Groove 44 is located radially inwardly from the sealing ring 22 along an exterior peripheral surface 31 of the shaft sleeve 40. The sealing ring 22 is also retained in axial position against a radial extension of shaft sleeve 40 by a spacer sleeve 32. O-ring seal 36 precludes leakage between the sealing ring 22 and the shaft sleeve 40. Shaft sleeve 40 is located axially against a step on the shaft 12 by a locknut 34, which is threaded on the shaft 12 as shown. Concentricity of the shaft sleeve 40 with respect to the shaft 12 is provided by a pair of centering strips 42' situated at opposite ends of sleeve 40 in axial direction, each strip 42' being located and retained within an inwardly facing dovetail groove 44'. Grooves 44' are located radially outwardly from the shaft 12 along opposite ends of an interior peripheral surface 33 of the shaft sleeve 40. In operation, the radially extending face 24 of the sealing ring 22 and the radially extending face 20 of the sealing ring 18 are in a sealing relationship, maintaining very narrow clearance, generated by a shallow and concentric hydrodynamic groove pattern 38, where the subject grooves extend from the outer periphery of the face 24 inward, having in many cases a shape of the logarithmic spiral and ending at a diameter larger than that of the inner extent of sealing face 20. Pattern 38 can be electro-plated, etched or otherwise fabricated into face 24 of the sealing ring 22 or alternatively into face 20 of the sealing ring 18. Said narrow clearance prevents generation of friction heat and wear, yet limits outflow of the sealed fluid, present at space 14.

Figure 2:
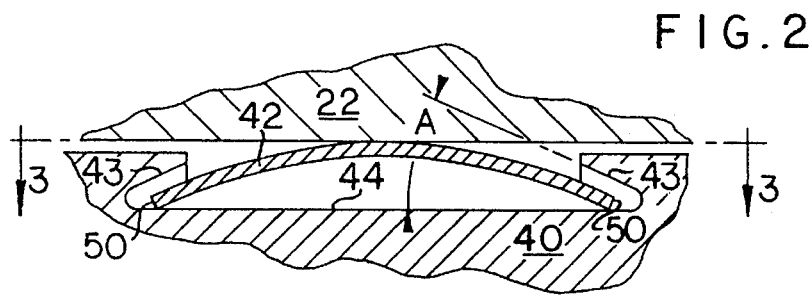
FIG. 2 is an enlarged fragmentary cross-sectional view of a centering arrangement used on the seal.

FIG. 2 shows an enlarged sectional view of the centering strip 42 within the dovetail groove 44 of the shaft sleeve 40. Strip 42 is in its relaxed shape prior to assembly with sealing ring 22. Sides or edges 50 of the strip 42 are retained within the groove 44 by groove undercuts or sidewalls 43, each defining an acute angle A with the bottom surface or wall of the groove 44. The angle must measure less than 90 degrees and preferably measure in the range of about 30 to 70 degrees in order that the centering strip is securely retained within the groove during the assembly process of ring 22 and sleeve 40 and during seal operation. Strip 42 is installed into the groove 44 for example by compression, where its sides 50 are squeezed together close enough for the strip to pass through the narrow part of the groove 44. Strip 42 is then expanded and assumes its shape within the wide part of the groove 44, formed by undercuts 43.

Figure 3:
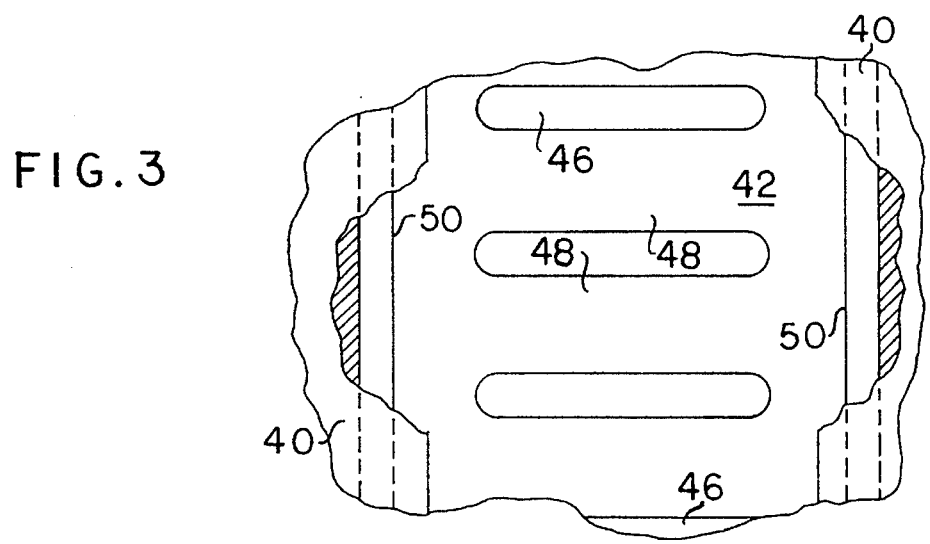
FIG. 3 is a view, partially broken away, of a centering strip taken generally in a plane indicated by line 3—3 of FIG. 2.

FIG. 3 shows the plane view of the centering strip 42 as installed within the groove 44 and retained. Elongated perforations 46 provide for bridges 48 between both continuous sides 50 of the strip 42. Bridges 48 have a function of curved beams, which are loaded in their center by centering forces and the geometry of which is determined from the centering force and elastic deformation required. Through this ladder-like design of strip 42 it is then possible to have smooth edges 50 for ease of installation and positive retention as well as minimize gap variation at its ends when deflected.

I claim:

1. A device for sealing a fluid within a space between a housing and a rotatable shaft projecting along a central axis, said device comprising:

a first seal ring mounted on said shaft for rotation therewith and having a back surface and a planar front sealing surface;

a second seal ring being axially moveable and substantially coaxial with said first seal ring and having a planar sealing surface defining a clearance with said planar front sealing surface of said first seal ring, said second seal ring being acted upon by said fluid to close said clearance;

resilient means for biasing said second seal ring towards said first seal ring to close said clearance;

at least one of said sealing surfaces having a plurality of grooves formed therein for introducing said fluid between said planar sealing surfaces to thereby urge said sealing surfaces away from each other;

a shaft sleeve coupled to said shaft and said first seal ring for rotation therewith, said shaft sleeve including a radially inner annular surface having at least one annular recess adjacent and surrounding said shaft;

said at least one annular recess including a bottom surface and two slanted side surfaces which cooperate to define an axial width that decreases in a direction extending from said bottom surface toward said radially inner annular surface;

a centering strip disposed within said recess and retained by said slanted side surfaces for resiliently contacting said shaft to position said shaft sleeve concentrically around said shaft; and each said slanted side surface extending at an acute angle from said bottom surface in a range of about 30 to 70 degrees relative thereto.

2. The device according to claim 1, wherein said centering strip comprises two elongated and circumferentially extending side portions which are interconnected in an axially spaced relationship by a plurality of curved elastic links.

3. The device according to claim 2, wherein said centering strip is made of a spring material.

4. A device for sealing a fluid within a space between a housing and a rotatable shaft projecting along a central axis, said device comprising:

a first seal ring mounted on said shaft for rotation therewith and having a back surface and a planar front sealing surface;

a second seal ring being axially moveable and substantially coaxial with said first seal ring and having a planar sealing surface defining a clearance with said planar front sealing surface of said first seal ring, said second seal ring being acted upon by said fluid to close said clearance;

resilient means for biasing said second seal ring towards said first seal ring to close said clearance;

at least one of said sealing surfaces having a plurality of grooves formed therein for introducing said fluid between said planar sealing surfaces to thereby urge said sealing surfaces away from each other;

a shaft sleeve coupled to said shaft and said first seal ring for rotation therewith, said shaft sleeve including a radially outer annular surface having an annular recess adjacent and surrounded by said first seal ring;

said at least one annular recess including a bottom surface and two slanted side surfaces which cooperate to define an axial width that decreases in a direction extending from said bottom surface toward said radially outer annular surface;

a centering strip disposed within said recess and retained by said slanted side surfaces for resiliently contacting said first ring seal to position said first ring seal concentrically around said shaft sleeve; and each said slanted side surface extending at an acute angle from said bottom surface in a range of about 30 to 70 degrees relative thereto.

5. The device according to claim 4, wherein said centering strip comprises two elongated and circumferentially extending side portions which are interconnected in an axially spaced relationship by a plurality of curved elastic links.

6. The device according to claim 5, wherein said centering strip is made of a spring material.

7. A seal apparatus for sealing a fluid within a space defined between a housing and a rotatable shaft projecting along a central axis, said apparatus comprising:

a first annular seal nonrotatably secured relative to and positioned concentrically about said rotatable shaft within said housing and having a first planar sealing surface extending traverse to said central axis;

a second annular seal nonrotatably secured relative to said housing in substantially coaxial alignment adjacent said first seal and having a second planar sealing surface facing said first sealing surface;

elastic means for axially biasing one of said seals toward a position of contact with the other said seal;

an annular shaft sleeve concentrically interposed and nonrotatably secured relative to said shaft and said first seal, said shaft sleeve and said shaft cooperating to define a radially inner pair of directly adjacent and radially opposed annular surfaces, and said shaft sleeve and said first seal cooperating to define a radially outer pair of directly adjacent and radially opposed annular surfaces;

resilient centering means cooperating with at least one of said pairs of adjacent annular surfaces for concentrically positioning said pair of adjacent annular surfaces with respect to one another;

said centering means including a dovetail-shaped annular groove opening radially from one annular surface of said one pair of adjacent annular surfaces, said groove having an annular bottom wall extending axially in a direction along said central axis and axially spaced-apart sidewalls which are axially undercut to define annular undercut groove portions which are disposed adjacent axially opposite sides of said bottom wall; and said centering means also including a substantially elongate centering strip disposed within and extending annularly along said groove and having first and second edge portions which are respectively disposed within said undercut groove portions for confinement under the undercut sidewalls, and a resilient central portion extending between said edge portions and projecting radially of the groove for resiliently contacting the other annular surface of said one pair of adjacent annular surfaces.

8. The apparatus as claimed in claim 7, wherein said centering strip comprises two elongated and circumferentially extending side portions which are interconnected in an axially spaced relationship by a plurality of curved elastic links.

9. The apparatus as claimed in claim 8, wherein each of said undercut sidewalls extends radially from said bottom surface at an angle from about 30 to 70 degrees relative thereto.

10. The apparatus as claimed in claim 7, wherein each of said undercut sidewalls extends radially from said bottom surface at an angle from about 30 to 70 degrees relative thereto.

11. The apparatus as claimed in claim 7, wherein said centering strip cooperates between said shaft sleeve and said first seal.

12. The apparatus as claimed in claim 7, wherein said centering strip cooperates between said shaft sleeve and said shaft.

13. The apparatus as claimed in claim 12, including second resilient centering means cooperating between the other of said pair of adjacent annular surfaces, said second resilient centering means being constructed substantially the same as said first-mentioned resilient centering means.

14. A seal apparatus for sealing a fluid within a space defined between the housing and a rotatable shaft projecting along a central axis, said apparatus comprising:

a first annular seal nonrotatably secured relative to and positioned concentrically about said rotatable shaft within said housing and having a first planar sealing surface extending transverse to said central axis;

a second annular seal nonrotatably secured relative to said housing in substantially coaxial alignment adjacent said first seal and having a second planar sealing surface facing said first sealing surface;

elastic means for axially biasing one of said seals toward a position of contact with the other said seal;

an annular sleeve cooperating between and nonrotatably secured to said shaft and said first seal, said annular sleeve and said first seal cooperating to define a pair of directly adjacent and radially opposed annular surfaces;

resilient centering means cooperating with said pair of opposed annular surfaces for concentrically positioning said pair of adjacent annular surfaces with respect to one another;

said centering means including a dovetail-shaped annular groove opening radially from one annular surface of said pair, said groove having an annular bottom wall extending axially in a direction along said central axis and axially spaced-apart sidewalls which are axially undercut to define annular undercut groove portions which are disposed adjacent axially opposite sides of said bottom wall; and said centering means also including a substantially elongate centering strip disposed within and extending generally annularly along said groove and having first and second edge portions which are respectively disposed within said undercut groove portions for confinement under the undercut sidewalls, and a resilient central portion extending between said edge portions and projecting radially of the groove for resiliently contacting the other annular surface of said pair.

15. The apparatus as claimed in claim 14, wherein said centering strip comprises two circumferentially extending side portions which are circumferentially elongated and which are interconnected in an axially spaced relation by a plurality of curved elastic links which are spaced apart in the circumferentially extending direction.

* * * * *